United States Patent
Oken

[15] 3,660,119

[45] May 2, 1972

[54] SILICATE BINDERS FOR ZINC-RICH PAINTS

[72] Inventor: Aaron Oken, R.D. #2, Sills Mills Road, Kennett Square, Pa. 19348

[22] Filed: Apr. 14, 1970

[21] Appl. No.: 28,551

Related U.S. Application Data

[63] Continuation-in-part of Ser. No. 736,948, June 14, 1968, abandoned.

[52] U.S. Cl. ..............................106/1, 106/14, 106/287 SE, 117/131, 117/135.1, 117/160 R
[51] Int. Cl. ........................................................C09d 5/10
[58] Field of Search ...............106/1, 14, 38.3, 38.35, 287 B, 106/84 M; 117/135.1, 131, 160

[56] References Cited

UNITED STATES PATENTS

| | | | |
|---|---|---|---|
| 3,202,517 | 8/1965 | Jarboe et al. | 106/14 |
| 3,232,771 | 2/1966 | Pearce | 106/38.35 |

FOREIGN PATENTS OR APPLICATIONS

| | | | |
|---|---|---|---|
| 163,467 | 6/1955 | Australia | 106/287 |
| 612,622 | 11/1948 | Great Britain | 106/287 |
| 647,537 | 12/1950 | Great Britain | 106/287 |

*Primary Examiner*—Lorenzo B. Hayes
*Attorney*—C. Walter Mortenson

[57] ABSTRACT

New compositions of matter are made available which contain silicate esters and an alkaline material, the mixtures being kept anhydrous until their use. The compositions are zinc-rich paints, a silicate ester and an alkaline material mixture being mixed with zinc dust. Upon use, the blend is spread out as a coating. Upon exposure to the moisture in air, drying occurs rapidly with the formation of very hard finishes that greatly resist cutting by sharp edges.

7 Claims, No Drawings

SILICATE BINDERS FOR ZINC-RICH PAINTS

This is a continuation-in-part of my application Ser. No. 736,948, filed on June 14, 1968, now abandoned.

This invention deals with an improved silicate binder for particulate matter which is especially useful in the preparation of zinc-rich paints. It also deals with a storage stable zinc-rich paint comprising a mixture of a catalyst, zinc, and ethyl silicate, which mixture is highly reactive to atmospheric moisture and cures rapidly when exposed to the air. More particularly, this invention deals with the provision of hermetically sealed zinc-rich paints.

It is well known that ethyl silicate will react with water and hydrolyze to silica, as follows:

$$(EtO)_4Si + 4H_2O \rightarrow [Si:(OH)_4] \rightarrow SiO_2 + 4EtOH$$

and it has been proposed that the silicate material be used either by itself or with added pigments and fillers as a paint. However, in the absence of acid or alkaline catalysts, water and ethyl silicate react very slowly, and by itself ethyl silicate makes an impractical paint. In the past, this slow conversion to silica has been accelerated by first partially hydrolyzing the ethyl silicate with a limited amount of water. When this hydrolysis is carried out with an acid catalyst, usually hydrochloric acid, a fairly stable solution of partially hydrolyzed ethyl silicate can be obtained. When this partially hydrolyzed ethyl silicate containing the acid catalyst is spread out in a thin film the absorption of relatively small amounts of atmospheric moisture completes the hydrolysis of the ethyl silicate and this then fully hydrolyzed ethyl silicate (or silicic acid) condenses to silica in a relatively short time.

However, there is a practical limit as to how much this conversion can be accelerated by prehydrolyzing the ethyl silicate; the more completely the ethyl silicate is prehydrolyzed the more rapid is the subsequent conversion to silica on exposure to the air but the more unstable is the prehydrolyzed ethyl silicate to storage since it tends to convert spontaneously to silica on standing and the shelf life is shortened.

In practice it has been found that this partially hydrolyzed ethyl silicate can be used to make very good zinc-rich paints for protecting steel from corrosion. When this partially hydrolyzed ethyl silicate is mixed with zinc dust and applied to a steel surface, the final coating, a mixture of zinc, silica and their various reaction products such as zinc silicate, is a hard, stone-like coating with excellent anti-corrosion properties.

Unfortunately, the hardening of these zinc-rich paints requires optimum conditions of temperature and humidity which are seldom encountered in actual field conditions. In practical use, the setting up of the paint is often slow and erratic and the properties of the final coating are uncontrollably variable.

Moreover, all presently known zinc-rich paints based on partially hydrolyzed ethyl silicate are two component systems: that is, they are packaged with the zinc dust and the silicate solution in separate containers that must be mixed just prior to use since, under the influence of the acid catalyst, the partially hydrolyzed ethyl silicate will react with the zinc and the paint will rapidly set up in the container to a solid mass.

Thus, an objective of this invention is the provision of compositions of matter or articles of manufacture which overcome the above problems. A further aim is the providing of stable compositions which have long shelf lives. A still further goal is the provision of a silicate mixture which can be stored in a container in an unhydrolyzed state for long time periods but which, upon opening the container, can be used as a coating material to produce hard, protective coatings. These and other purposes of this invention will appear hereinafter.

It is well known that ethyl silicate reacts extremely rapidly with alkaline solutions and is converted directly to silica. I have found, however, that an anhydrous solution of ethyl silicate and an alkaline material is stable and shows an indefinite shelf life provided that moisture is excluded from the mixture. When a thin film of this anhydrous mixture is exposed to atmospheric moisture, the liquid film can be converted to silica in as short a time as 10 minutes. In comparison, an uncatalyzed film of ethyl silicate will remain liquid for several weeks and films of acid catalyzed, partially hydrolyzed ethyl silicate require several hours to solidify. Importantly, I have also found that zinc dust may be added to the anhydrous silicate mixture and that the anhydrous composite when sealed, preferably hermetically, is stable over long periods of time, being usable as a coating material when desired.

The most effective alkaline catalysts for use in this invention are those which can be brought into solution with ethyl silicate in an anhydrous solvent. For example, anhydrous solutions of sodium hydroxide or, still better, sodium methoxide in methanol are excellent catalysts. Magnesium ethoxide on the other hand is not completely soluble in an alcoholic ethyl silicate mixture and is less effective as a catalyst. Finally, particulate alkaline materials such as trisodium phosphate suspended in ethyl silicate are only slightly effective catalysts: such mixtures require several days to harden. It is preferred that the catalyst be present in a dissolved state.

It is an important feature of this invention that the ethyl silicate solution with the alkaline catalyst be anhydrous. In this way, a stable mixture is obtained which shows an indefinite shelf life. It is only when this mixture is exposed to moisture that the hardening reaction begins.

This anhydrous mixture has another important practical advantage. Although it is well known that zinc is rapidly attacked by alkaline solutions, under the anhydrous conditions of this invention zinc and alkali are unreactive and the paint can be packaged as a completely mixed one-container system with an indefinite shelf life. I have found that, properly formulated, such mixtures of ethyl silicate, zinc and an alkaline catalyst will dry rapidly under any conditions of temperature and humidity that are likely to be encountered in actual use. Even at below freezing temperature and very low humidity such films will be touch dry in 1 hour and have the unusually high scratch and mar resistance of zinc-rich silicate coatings in 2 to 3 hours. Under typical summer atmospheric conditions the coating will be touch dry in 15 minutes and essentially completely hard in 1 hour. These coatings protect steel against fresh and salt water corrosion at least as well as the more conventional types of zinc-rich paints.

Although all the foregoing has mentioned ethyl silicate as the basis material, this invention is not limited to simply tetraethyl orthosilicate. The same results are obtained with partially polymerized forms of ethyl silicate. These materials are known in commerce as condensed ethyl silicates. In fact, the preferred form of ethyl silicate for this invention is a polymerized product which contains 40 percent of silica and is known technically as ethyl silicate "40." Furthermore, it is to be understood that the products of this invention are not limited to the simple solutions so far described. In addition to the ethyl silicate, zinc and alkaline catalyst one can add a variety of materials to achieve certain desired purposes. For example, one may add suspending agents such as bentonite clays to help disperse the zinc dust, and one may add various inert pigments to color the final coating. Furthermore, these anhydrous, alkaline solutions of ethyl silicate are not limited to use only with zinc. One can obtain excellent completely inorganic coatings by adding titanium dioxide or other alkali stable pigments to the solution.

The following examples illustrate the invention but are not limitative:

EXAMPLE I

Zinc dust (600 g.) was added under anhydrous conditions, as, for example, by operating under dry nitrogen, to a mixture of 124 g. of ethyl silicate "40," 40 g. of a 25 percent solution of sodium methoxide in methanol and 25 cc. of Cellosolve in a high shear stirrer. Within 5 minutes a smooth paint was formed which was stored in a tightly stoppered jar. When this freshly prepared paint was coated onto a sandblasted steel panel and exposed to the atmosphere at 85° F. and 82 percent relative humidity, the coating was dry to the touch in 1 hour. After 24 hours the coating resisted scratching with a sharp knife. The one day old coating was placed in a salt spray chamber for 500 hours. After this time, the panel was completely rust free and the initially formed cuts in the coating had healed over to form a uniformly dense surface.

After 5 months of storage in a container sealed against the atmosphere, this paint was again applied to a steel panel and exposed to the atmosphere at 28° F. In 1 and ½ hours the coating was again dry to the touch and after 24 hours was completely hard and cut resistant.

EXAMPLE II

Zinc dust (600 g.) was added under anhydrous conditions as above to a mixture of 124 g. of ethyl silicate "40," 20 g. of a 25 percent solution of sodium methoxide in methanol, 20 cc. of anhydrous methanol and 25 cc. of Cellosolve in a high shear stirrer and blended to a smooth paint. When the freshly prepared paint was exposed to the atmosphere at 85° F. and 82 percent relative humidity, the coating was dry to the touch in 1 and ½ hours and seemed completely hard after 24 hours.

Again, after storage for several months, similar coatings are obtained from the stored mixture.

EXAMPLE III

Zinc dust (600 g.) was added to 124 g. of ethyl silicate "40, " 80 g. of a 25 percent solution of sodium methoxide in methanol and 25 cc. of Cellosolve and blended in a high shear stirrer to a smooth paste. When the paint was coated onto a steel surface it formed a hard film in 20 minutes which on further curing cracked and curled from the substrate.

This example demonstrates the effect of using too much catalyst.

EXAMPLE IV

Zinc dust (600 g.) was added under anhydrous conditions to a mixture of 124 g. of ethyl silicate "40" and 100 g. of a 10 percent solution of potassium hydroxide in anhydrous ethyl alcohol in a high shear stirrer. Within 5 minutes a smooth paint was formed which was stored in a tightly stoppered jar. When this paint was coated onto metal and exposed to the atmosphere, the coating was dry to the touch in 1 and ½ hours and after 24 hours was completely hard.

EXAMPLE V

Sodium hydroxide (10 g.) was ball milled with 50 g. of toluene for 8 hours to break down the sodium hydroxide into a fine powder suspended in the toluene. This mixture of sodium hydroxide and toluene was added to 600 g. of zinc dust and 124 g. of ethyl silicate "40" in a high shear stirrer and milled to give a smooth paint. When this freshly prepared paint was coated onto metal panels and exposed to the atmosphere, the film became dry to the touch in 4 hours and after 48 hours was completely hard. After 4 months of storage, this composition was again coated onto metal panels and exposed to the atmosphere. After 4 hours the coating was dry to the touch and was hard after 48 hours.

The critical proportions of ethyl silicate and alkali which will give useful products fall in the range of 1 percent of inorganic alkali by weight based on the weight of the silicate as the lower limit to 15 percent as the upper limit. The preferred range is within the ratio 5–10 percent of alkali, and the preferred silicate is ethyl silicate. The ratio of zinc to total solids (zinc and silica) can very widely depending on the anticipated use of the paint. For most applications the zinc content will be from 60–95 percent, with the preferred range from 80–92 percent, of the total solids.

The silicate is normally tetraethoxy silane (ethyl silicate) obtainable commercially generally as a mixture which includes ethyl polysilicates which occur from partial hydrolysis and condensation reactions. While ethyl silicate is preferred, other silicyl esters may be used including other lower alkoxy silanes, aryloxy silanes and aralkoxy silanes such silanes containing methyl propyl, butyl, ethyl-hexyl, phenyl, benzyl groups, or the like, as desired. Commercially, ethyl silicate is the only important one, and it is obtainable as tetraethyl orthosilicate, condensed ethyl silicate and ethyl silicate "40," the latter, because of its high silica content, being preferred. The silica content usually is in the 40–45 percent range and the industry's wide use of zinc silicates is generally based on ethyl silicate having 40–45 percent silica content.

The catalysts used in this invention include sodium methoxide, sodium ethoxide, potassium methoxide, potassium ethoxide, sodium hydroxide and potassium hydroxide, lithium hydroxide and lithium methoxide, lithium ethoxide, lithium isopropoxide, lithium butoxide, as well as the similar alkoxides of sodium and potassium. In practice, sodium methoxide is preferred for its low cost and availability. Solution of the catalysts in the silicate is effected by using a solvent in which the catalyst and the silicate are soluble. Such solvents are the lower alcohols such as methanol, ethanol, propanols and Cellosolve. While other solvents can be used, these are cheap and effective materials and are conveniently placed in the anhydrous form needed for the purposes of this invention. While ethyl alcohol is produced as a product during the setting reactions, it is to be appreciated that the intimate contact of the silicate and the catalyst is needed to effect that production and, therefore, solution is effected before the curing is to begin. Thus, solutions of the alkaline catalysts varying in solids content from about 1 percent to about 30 percent are used, with a 25 percent concentration usually being used. Suspension of alkaline catalyst can be effected in a wide variety of solvents such as benzene, toluene, the alcohols named above and the like.

Anhydrous conditions are obtained and maintained in any of the conventional ways. Starting materials, such as methanol and the silicate, are readily placed in anhydrous condition as, for example, by drying them in conventional, commercial dryers to mention only one method. The mixing steps are generally done under a blanket of the inert gas. While a number of such gases can be used, dry nitrogen is ordinarily used because of its ready availability and low cost. While it is possible to add to the compositions of this invention materials which will react with or otherwise destroy or remove water, should water vapor get into the compositions of this invention prior to their use, generally such preventive steps are not needed. One reason for this is that the compositions of this invention are usually packaged with residual nitrogen gas still within the mass, so that the packaged product is actually under a slight pressure. Further, the packaging art is quite highly developed so that precision and very tight seals are very readily obtained with the result that the probability of leakage and exposure to humid air prior to use is very slight. Thus, the mixtures of this invention usually can be poured into a container and simply sealed, since they usually contain a solvent the evaporation of which just prior to sealing leads to the formation of a hermetical seal since air is driven out of the container by the evaporation.

As already mentioned, these alkali catalyzed mixtures of silicate esters and zinc dust are valuable not only for the fact that the anhydrous mixtures are storage stable but also for the fact that they react very rapidly with moisture. For example, under typical summer atmospheric conditions, the coatings of the composition of this invention will dry to the touch in 15 minutes and be completely hard in 2–3 hours while acid catalyzed mixtures of partially hydrolyzed ethyl silicate will require several hours before they are sensibly hard, and uncatalyzed ethyl silicate by itself will remain fluid for several weeks.

While this invention has been described with particular reference to zinc silicates, it is to be understood that the principles of this invention apply also to zinc-lead silicates, zinc phosphate silicates and zinc titanate silicates and to silicates that contain inert finely divided materials such as pulverized polymers, pulverized and other forms of clays, pigments and the like, as, for example, iron oxide, chromium oxide, carbon black, titanium oxide, ocher and raw sienna, and silica may be added as suspending agents and thickeners.

The products of this invention may be used not only in creating protective coatings for all sorts of surfaces, metal and non-metal, but in bonding and in impregnating procedures.

It is well known that if a mixture of zinc dust, ethyl silicate or partially hydrolyzed ethyl silicate, and an acid catalyst is applied as a coating to metal surfaces and exposed to atmospheric moisture, water absorbed from the air will convert the ethyl silicate into a silica binder for the zinc dust and form a hard, impervious, corrosion resistant coating on the metal. By itself, however, water and ethyl silicate react too slowly to give a useful coating and it is the function of the acid catalyst, usually hydrochloric acid, to accelerate this reaction to provide a practical composition. However, this acid catalyzed mixture is not storage stable since various reactions can take place between the components. For example, the acid reacts with the zinc dust to produce hydrogen gas and zinc ions. The zinc ions and the partially hydrolyzed ethyl silicate in turn react to form zinc silicate. As these reactions proceed, the mixture sets to a solid mass in the can. For this reason, all conventional zinc-rich paints are sold as two component mixtures consisting of a container of zinc dust and a separate container of ethyl silicate and hydrochloric acid. These components must be mixed just before application since the pot life of the complete mixture is measured in hours. Moreover, even the acid catalyzed reaction of ethyl silicate and water is rather slow and, as a result, the rate at which the coating hardens is dependent upon the temperature and humidity of the environment. This variability in the drying time of conventional, acid catalyzed coatings produces coatings which show widely variable properties of corrosion resistance.

As shown above, use of certain inorganic alkaline catalysts allows one to prepare a single container mixture of zinc and ethyl silicate which is not only highly reactive to atmospheric moisture but, even more surprising, is indefinitely stable in the sealed can. These compositions, which will harden in minutes when exposed to atmospheric moisture, remain unchanged for at least 1 year when stored in an anhydrous condition.

It is well known that mixtures of amines and ethyl silicate will give stable mixtures which harden rapidly when exposed to moisture. In addition, it is known that various inert materials such as sand and clay can be added to this mixture of ethyl silicate and amines with no ill effects upon the storage stability of the anhydrous systems. However, I have found that mixtures of amines, ethyl silicate and zinc dust do not give stable mixtures. Such a mixture on standing at room temperature starts to develop a yellow color after a few weeks' time. After 4 to 6 weeks, the mixture is dark brown and is no longer reactive to moisture. For this reason, the use of amines is to be avoided in the preparation of shelf stable, single container zinc-rich paints.

Quite surprisingly, I have found that zinc dust, ethyl silicate and very strong inorganic bases such as sodium hydroxide or sodium methoxide are shelf stable for at least 18 months and after this time are still very reactive to moisture and form coatings which harden rapidly on exposure to the air.

The most effective catalysts for this purpose are solutions of alkali metal alkoxides in alcohols. These may be prepared by adding sodium to various alcohols such as methanol or ethanol, for example, or by dissolving pre-formed sodium methoxide in alcohols, or by dissolving sodium hydroxide in alcohols. Finely divided sodium hydroxide is also an effective catalyst although its effectiveness may be due at least in part to the fact that the hydrolysis of the ethyl silicate furnishes ethyl alcohol which can react with the hydroxide to form sodium ethoxide in situ.

While this invention has been described with particular reference to zinc and silica, it is understood that the principles of this invention encompass a broad range of materials that can be used as inert or reactive fillers in the silicate binder. For, example, this invention can also be applied to mixtures of zinc and lead with silicate, or with the metal wholly or partially in the form of oxides such as zinc and lead oxide, or as phosphates, silicates, titanates, etc. In addition, it is understood that the principles of this invention are not limited to the application of coating to metals; with appropriate fillers and pigments, storage stable but highly reactive compositions can be prepared which show excellent adhesion to ceramics, cement, stone and glass, and such compositions are to be included in the scope of this invention.

While the invention has been disclosed herein in connection with certain embodiments and certain structural and procedural details, it is clear that changes, modifications or equivalents can be used by those skilled in the art; accordingly, such changes within the principles of the invention are intended to be included within the scope of the claims below.

I claim:

1. In a zinc-rich paint comprising zinc dust and an anhydrous vehicle comprising an alkyl polysilicate, the improvement comprising an alkali metal alkoxide in said paint in an amount sufficient to catalyze the hardening of said paint.

2. The paint in accordance with claim 1 in which said vehicle also contains an alcohol.

3. The paint in accordance with claim 2 in which said alcohol is ethanol.

4. The paint in accordance with claim 1 in which said alkoxide is sodium ethoxide.

5. The paint in accordance with claim 1 in which said amount of said alkoxide is about 1 percent to about 15 percent based on the weight of said silicate.

6. The paint in accordance with claim 1 in which said zinc dust is present in amounts of about 60 percent to about 95 percent based on the total solids in said coating.

7. The paint in accordance with claim 1 in which said alkali metal is selected from the group consisting of sodium, potassium and lithium.

* * * * *